(12) United States Patent
Lenius

(10) Patent No.: US 7,223,307 B2
(45) Date of Patent: May 29, 2007

(54) DISC COATER

(75) Inventor: Steven J. Lenius, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 37 days.

(21) Appl. No.: 10/762,032

(22) Filed: Jan. 21, 2004

(65) Prior Publication Data

US 2005/0155547 A1    Jul. 21, 2005

(51) Int. Cl.
  *B64D 1/16* (2006.01)
  *B05C 11/00* (2006.01)
  *E01C 19/20* (2006.01)

(52) U.S. Cl. .................. 118/303; 118/610; 118/308; 118/DIG. 2

(58) Field of Classification Search .............. 118/303, 118/19–23, 308, 52, DIG. 2, 600, 610, 612; 366/137.8, 138, 135, 315; 239/650, 223, 239/224; 404/93, 94, 111
See application file for complete search history.

(56) References Cited

U.S. PATENT DOCUMENTS

| | | |
|---|---|---|
| 3,017,854 A | 1/1962 | O'Brien |
| 3,043,196 A | 7/1962 | Palmquist et al. |
| 3,171,827 A | 3/1965 | De Vries et al. |
| 3,175,935 A | 3/1965 | Vanstrum |
| 3,252,376 A | 5/1966 | De Vries |
| 3,254,563 A | 6/1966 | De Vries et al. |
| 3,274,888 A | 9/1966 | Vanstrum et al. |
| 3,288,052 A * | 11/1966 | Hough ............... 99/485 |
| 3,418,896 A | 12/1968 | Rideout |
| 3,486,952 A | 12/1969 | Vanstrum et al. |
| 4,675,140 A | 6/1987 | Sparks et al. |
| 4,740,390 A * | 4/1988 | Kulling ............... 427/213 |

(Continued)

FOREIGN PATENT DOCUMENTS

EP    0 254 791 A1    2/1988

(Continued)

OTHER PUBLICATIONS

ASTM E 808-01, Standard Practice for Describing Retroreflection, 2001.

(Continued)

*Primary Examiner*—Yewebdar Tadesse
(74) *Attorney, Agent, or Firm*—Rick L. Franzen

(57) ABSTRACT

A coater for separating primary particles that are coated with a sticky or tacky resin, and covering the surface of the primary particles with a secondary particle of smaller size is disclosed. The coater includes a disc having a periphery, a motor engaging the disc so as to be able to spin the disc, and a restrictor mounted adjacent to the disc so as to provide a gap for the egress of coated particles near the periphery of the disc. Other embodiments of the invention will also have a first dispenser for particles disposed above the disc. Also conveniently, the coater will also have a second dispenser for particles disposed above the disc. In one application for which the coater can be employed, the first dispenser will be adapted to dispense a mixture of sand particles and polymeric resin, and the second dispenser will be adapted to dispense retroreflective glass beads.

2 Claims, 5 Drawing Sheets

U.S. PATENT DOCUMENTS

Figure 1:
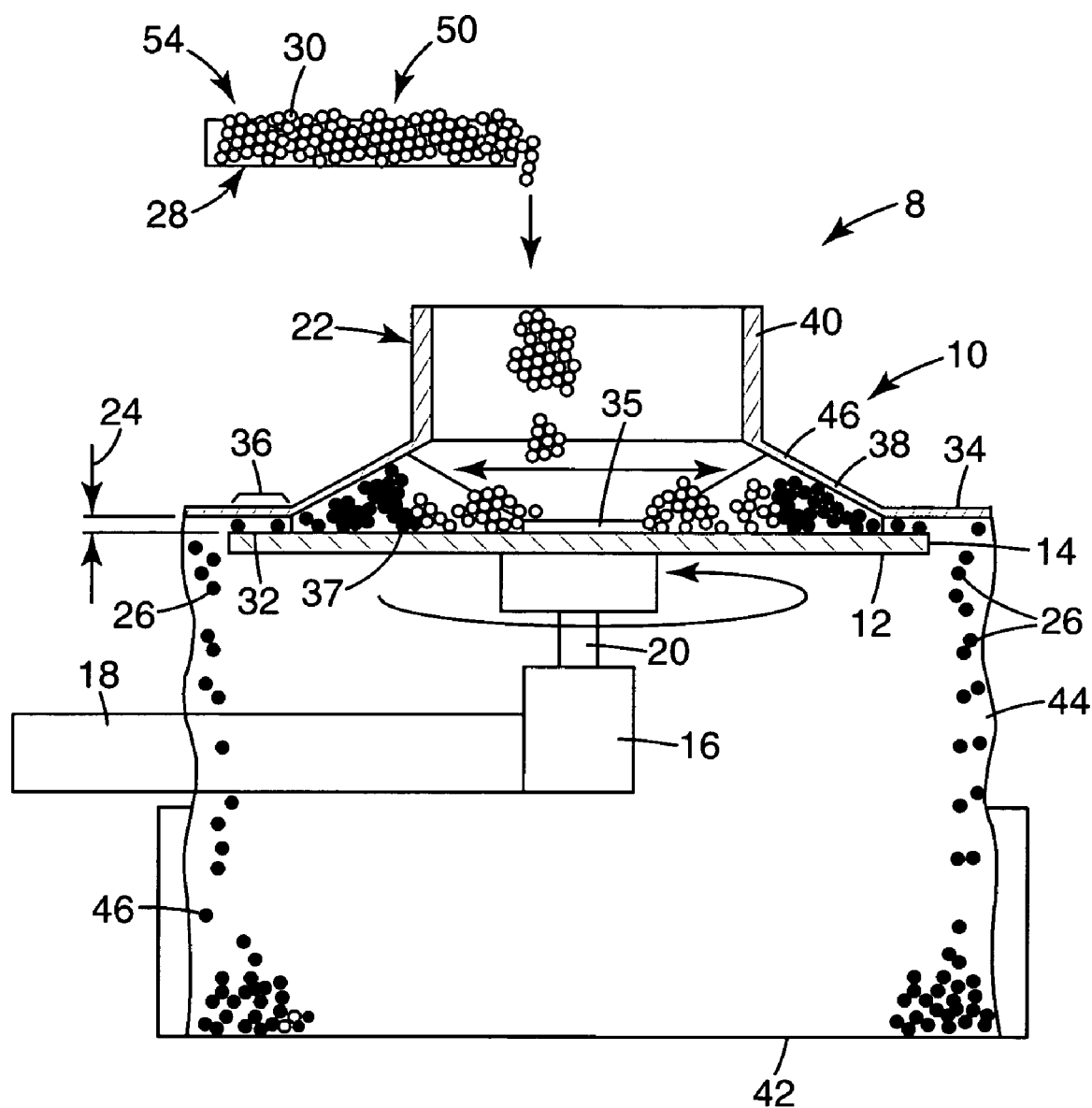

| | | | | |
|---|---|---|---|---|
| 4,834,545 | A | * | 5/1989 | Inoue et al. ................ 366/138 |
| 4,983,458 | A | | 1/1991 | Dejaiffe |
| 5,061,520 | A | | 10/1991 | Hermelin |
| 5,417,515 | A | | 5/1995 | Hachey et al. |
| 5,447,565 | A | | 9/1995 | Song et al. |
| 5,571,044 | A | * | 11/1996 | Bolandi et al. ............. 451/385 |
| 5,750,191 | A | | 5/1998 | Hachey et al. |
| 5,774,265 | A | | 6/1998 | Mathers et al. |
| 5,777,791 | A | | 7/1998 | Hedblom |
| 6,270,395 | B1 | * | 8/2001 | Towery et al. ................ 451/41 |

FOREIGN PATENT DOCUMENTS

| | | |
|---|---|---|
| EP | 0 565 765 | 10/1993 |
| EP | 1 347 099 | 9/2003 |
| FR | 2.106.821 | 5/1972 |
| GB | 2389615 | 12/2003 |

OTHER PUBLICATIONS

Paste and Viscous-Material Mixing, pp. 18-25 to 18-31, no date.

Multiquip, Essick Mixers, A Multiquip Product, 2003.

Ajax LynFlow™ Continuous Mixer from www.ajax.co.uk/conmix.htm, printed Jan. 20, 2004, 2 pages.

\* cited by examiner

DISC COATER

FIELD

The invention relates generally to the coating of particulate matter, and more particularly to a coater having a rotating disc onto which the particulate matter is dispensed for processing.

BACKGROUND

In the manufacture of number of different commercial products, it is necessary to coat or encapsulate particulate matter. Such coatings may be applied, for example, to protect the particles from the environment, to provide timed release for the material of the particles, or to provide improved handling characteristics for the particles. A number of general techniques are practiced for providing a coating for particles and some of the known techniques involve a coating apparatus including a spinning disc onto which particles are dispensed.

However, one application for which existing apparatus and methods are not well-suited is the application of a coating that is sticky or viscous. The art is particularly at a loss when it is contemplated to encrust a primary particle within an even coating of smaller secondary particles using a sticky resin. Such encrusted particles would be of great utility in the field of retroreflective pavement markings.

SUMMARY

The present disclosure provides a coater that is capable of separating primary particles that are coated with a sticky or viscous resin, and covering the surface of the primary particles with a secondary particle of smaller size. In a first aspect, the disclosure is directed to a coater for preparing coated particles. The coater includes a disc having a periphery, a motor engaging the disc so as to be able to spin the disc, and a restrictor mounted adjacent to the disc so as to provide a gap for the egress of coated particles near the periphery of the disc. Exemplary embodiments of the invention will also have a first dispenser for particles disposed above the disc. Conveniently, this first dispenser for particles will be adapted to dispense a mixture of particles and resin. Also conveniently, the coater will also have a second dispenser for particles disposed above the disc. In one application for which the coater can be employed, the first dispenser will be adapted to dispense a mixture of sand particles and polymeric resin, and the second dispenser will be adapted to dispense retroreflective glass beads.

Particularly in the just mentioned application, it is convenient to provide a disc where the surface of includes a resilient material. A polymeric foam, conveniently a polyurethane foam, is considered suitable for this purpose.

The restrictor is conveniently shaped with a flange portion positioned above the disc, such that the gap between the restrictor (or barrier) and the disc extends over a significant portion of the disc's radius. It is convenient for the restrictor to also have a portion adjacent to the flange portion, having a generally frusto-conical shape, so that the height of the space between the disc and the restrictor diminishes with radial distance from the center of the disc. While not being bound by theory, it is believed this arrangement meters the particles evenly into and through the gap. When the preparation of the retroreflective particles discussed above is contemplated, it is believed that optimal results will be obtained when the gap is set to a height only slightly larger than the maximum average size of one of the sand particles encrusted with a single layer of the retroreflective beads. It is believed that optimal results will be achieved when the disc is rotated at between about 360 and 720 rpm.

Many convenient embodiments of the coater will include a collection bin disposed beneath the disc. A barrier to divert coated particles emerging from the gap into the collection bin may also be provided.

BRIEF DESCRIPTION OF THE DRAWINGS

The invention of the present disclosure will be better understood upon a reading of the following detailed description, considered in connection with the accompanying drawings wherein:

FIG. 1 is a schematic cross-section view of an illustrative coating system including a disc coater according to the present invention;

FIG. 2 is a section view of the coating system of FIG. 1 further including a material delivery apparatus according to the present disclosure;

FIG. 3 is a close-up section view of a portion of FIG. 1;

FIG. 4 is a plan view of a disc and a restrictor arrangement according to the present disclosure;

FIG. 5 is a plan view of an exemplary disc according to the present disclosure;

FIG. 6 is another view of the coating system of FIG. 1; and

FIG. 7 is an opposite view of the coating system of FIG. 6.

DETAILED DESCRIPTION

Generally, the present disclosure is directed to a system for spin coating particles. Examples of products that can be made and methods that can be practiced using the invention of the present disclosure can be found in co-pending patent application having U.S. Ser. No. 10/761,874, entitled "METHODS OF MAKING REFLECTIVE ELEMENTS," which is herein incorporated by reference.

Referring now to FIGS. 1-7, a coating system including a disc coater according to the present disclosure is illustrated. The coating system 8 includes a coater 10 having a disc 12 having a periphery 14. A motor 16 is mounted below the disc 12 on a support 18, engaging the disc 12 by a shaft 20, so as to be able to spin the disc 12. The motor 16 can be directly or indirectly coupled to the disc 12 to effect rotation of the disc 12. Other means can also be used to rotate the disc, such as gear or belt driven arrangements, and the particular means used to rotate the disc 12 can vary widely.

A restrictor 22 is mounted adjacent to and above the disc 12 so as to provide a gap 24 for the egress of coated particles 26, typically near the periphery 14 of the disc 12. The illustrated embodiment has a dispenser 28 for particles disposed above the disc 12. This dispenser 28 conveniently includes a vibratory table 30 and is adapted to dispense various components onto the surface of disc 12. The particular apparatus used to deliver components to the disc for spin coating can be selected from many of the commercially available systems directed to material handling and delivery.

The upper surface 32 of the disc 12 is conveniently a resilient material, and polymeric foam, such as polyurethane foam, is suitable for this purpose. Optionally, the exposed surface of the resilient material may be initially prepared with a layer of adhesive or tacky material on the exposed upper surface 32, and this surface 32 may become modified during operation of the coater 10 by contact with the components dispensed by the dispenser 28. Similarly, the side of the restrictor 22 that contacts the particles can be optionally cover with resilient material.

The restrictor 22 has a flange portion 34 positioned above the disc 12 so that the gap 24 between the restrictor 22 and the disc 12 extends over a portion 36 of the radius of the disc 12. The restrictor 22 also conveniently has a portion 38 adjacent to the flange portion 34 and having a generally horn-like or frusto-conical shape so that the height of the space between the disc 12 and the restrictor 22 diminishes with radial distance from the center of the disc 12. This arrangement has been observed to meter evenly the material that has been dispensed onto the disc 12 into the gap 24.

The restrictor 22 may also include an inlet portion 40 for receiving and directing incoming particles. The illustrated coater 10 also includes a collection bin 42 disposed beneath the disc 12. A barrier 44 for example, a plastic skirt, is provided to divert coated particles 26 emerging from the gap 24 into the collection bin 42. The barrier 44 stops the radial motion of the particles thrown from the spinning disc 12 and channels the particles into the bin 42.

In some instances, the particles in the spin coater 10 tend to form agglomerations 37 in a region near the gap 24. In order to break up the agglomerations 37, a means for breaking up the agglomerations can be optionally provided. In the exemplary embodiment shown, a structure 35 protruding from the surface of the disc 12 is provided. The structure 35 can be formed integrally with the disc, or can be a separate piece, such as a strip of tape or metal. The structure 35 acts to break up the agglomerations 37 by mechanical action.

Figure 6:
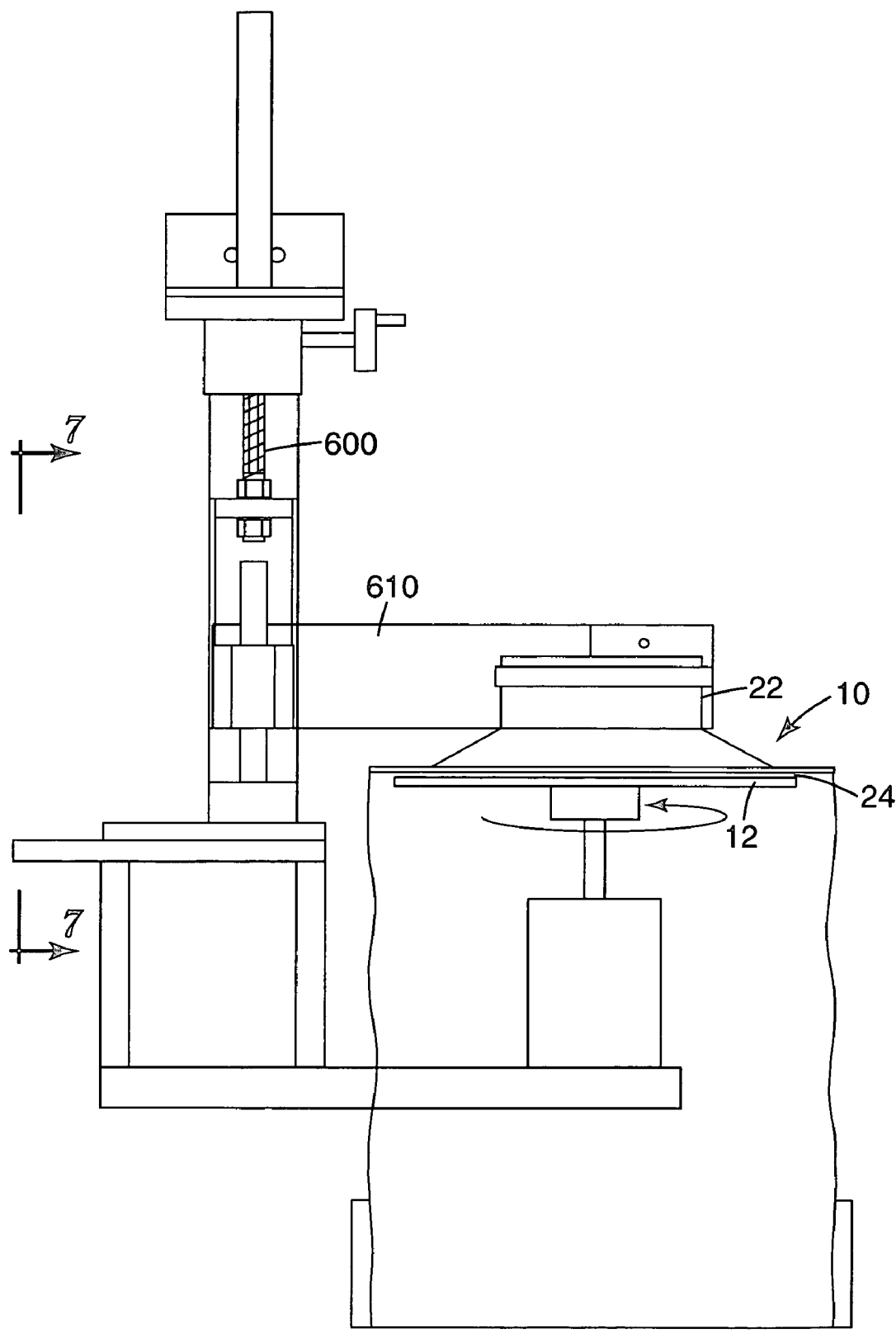
Figure 7:
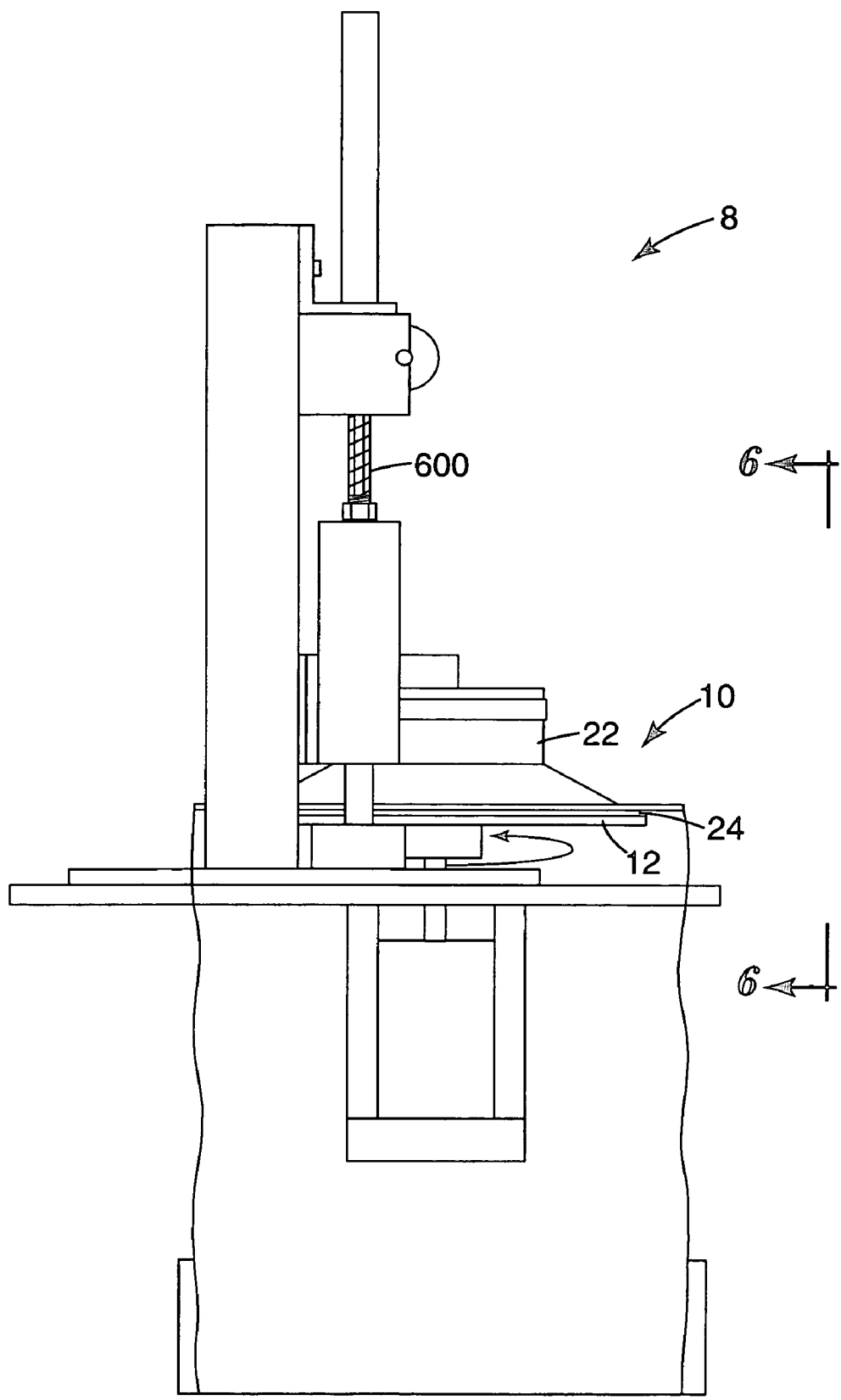

Referring to FIGS. 6 and 7, to facilitate setting the dimension of the gap 24 between the restrictor 22 and the disc 12, the restrictor 22 can be mounted on an adjustable frame 610. The frame 610 can be indexed via a screw mechanism 600, and the gap 24 can be set by adjustment of the screw mechanism 600.

While the illustrated coater 10 is of general application for spin coating, it is particularly suited for the task of providing primary particles encrusted with even coating of smaller secondary particles using a sticky resin. Such encrusted particles are particularly useful in the field of retroreflective pavement markings. The illustrated coating system 8 is particularly adapted for this application.

Figure 2:
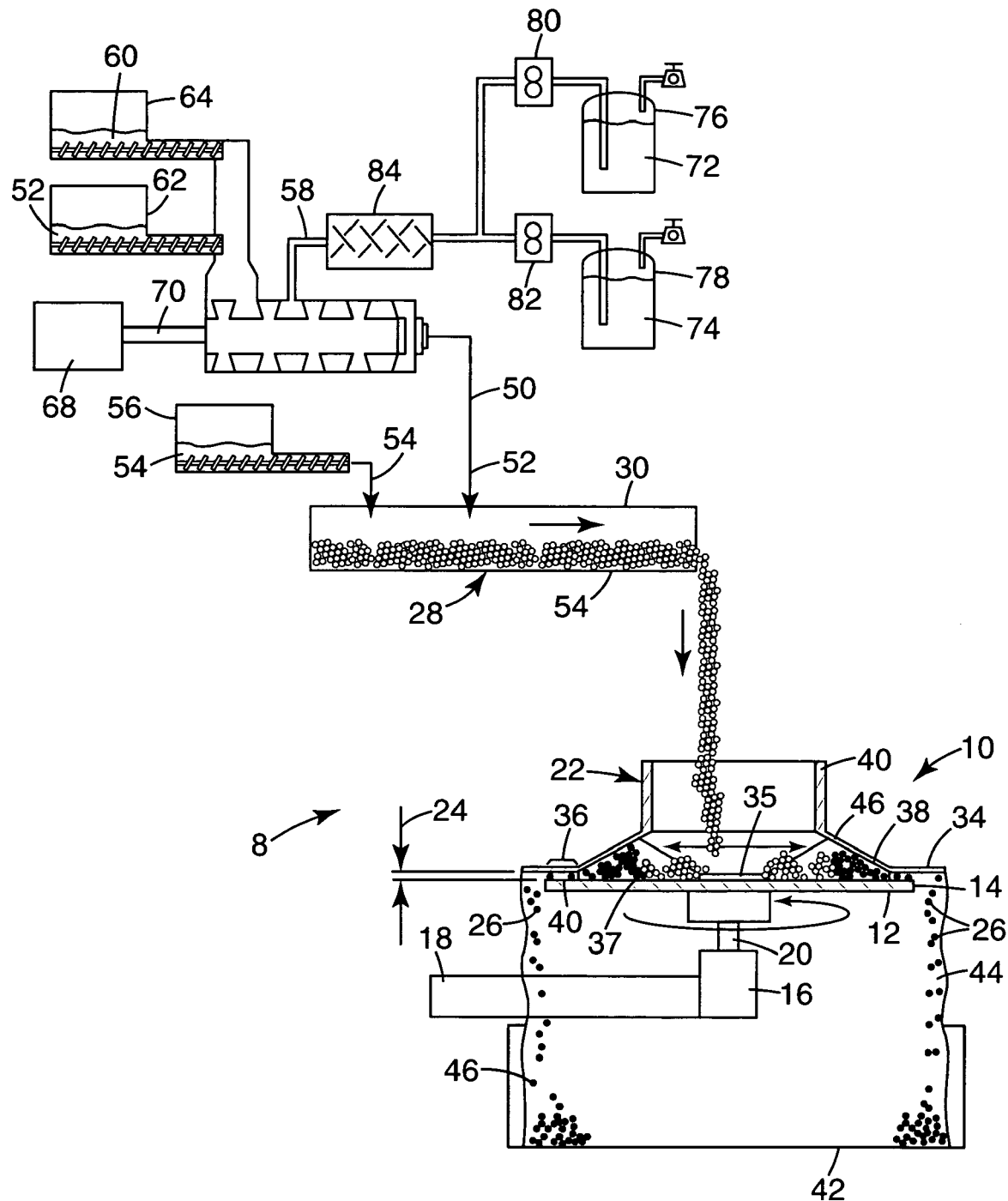
Figure 3:
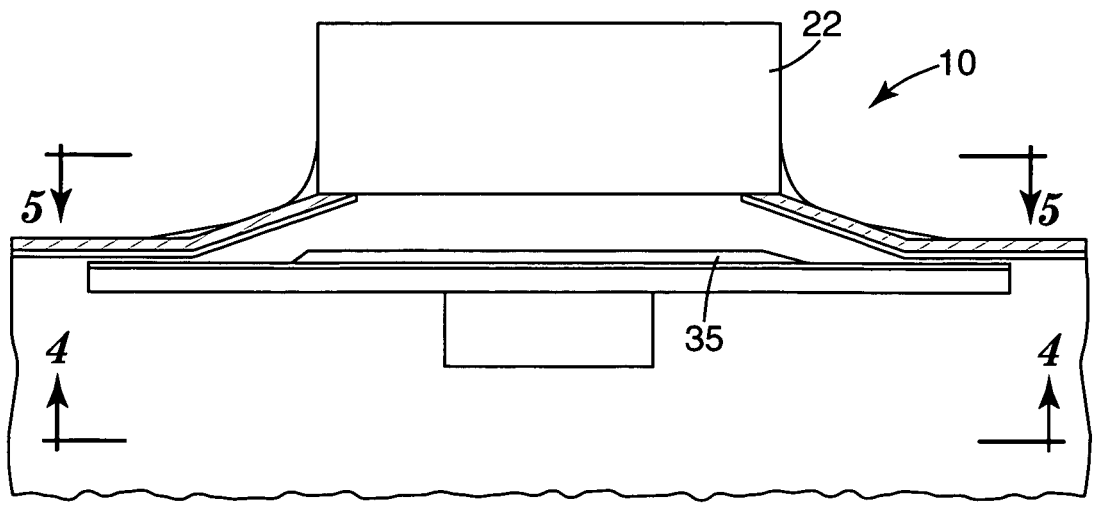
Figure 4:
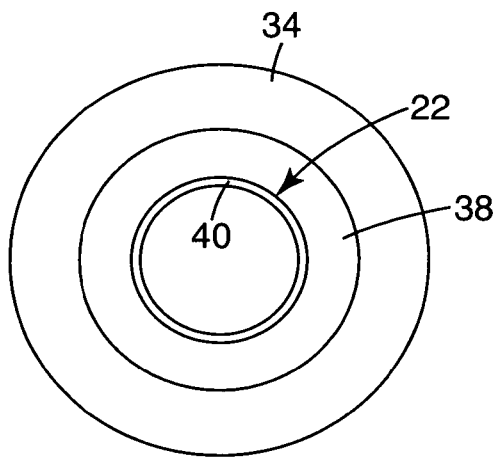
Figure 5:
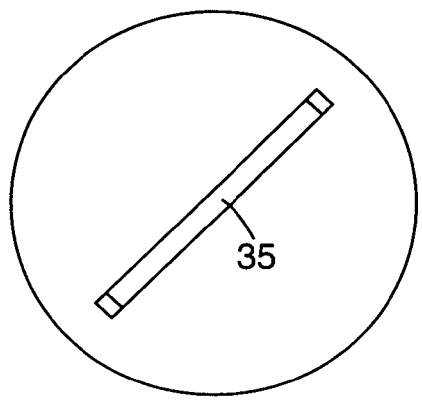

Referring to FIG. 2 in the illustrated embodiment, a mixture 50 including primary particles 52 is dispensed onto a vibrating tray 30. Secondary particles 54 are also conveniently dispensed onto the vibrating tray from a secondary particle dispenser 56. Alternatively, the secondary particles could be dispensed separately directly onto the disc 12.

In one exemplary aspect, the mixture 50 may conveniently comprise primary particles 52, an organic resin 58 and optionally additional material 60, such as pigments. The primary particles 52 are dispensed from a particle dispenser 62, and any additional material 60 may be dispensed from dispenser 64 into a dynamic mixer 66 driven by motor 68 by shaft 70. Organic resin 58 is also provided to the dynamic mixer 66. In the illustrated embodiment the organic resin 58 is prepared on the spot from two precursor materials 72 and 74, which are pumped from vessels 76 and 78 by pumps 80 and 82 into a static mixer 84.

EXAMPLE 1

A disc coater was constructed generally as depicted in FIGS. 1-7, according to the following specifications. The disc coater had a disc having an outside diameter of 22.9 cm (9 inches). The disc was constructed of metal and had adhered to its upper surface a layer of double-stick polyurethane foam adhesive tape (35 in FIG. 5) 0.8 mm ($\frac{1}{32}$ inch) thick, commercially available as Scotch™ Mounting Tape 110 from 3M Company of St. Paul, Minn.

The restrictor was constructed of metal and had an outside diameter of 22.9 cm (9 inches) and an inside diameter of 10.2 cm (4 inches). The restrictor had a frusto-conical portion, sloping downward at a 20 degree angle from the horizontal from the inside diameter to the point where the diameter was 17.8 mm (7 inches). Peripheral to the frusto-conical portion of the restrictor was a flange portion projecting horizontally from the end of the frusto-conical portion the rest of the way to the outside diameter. The restrictor was mounted adjustably over the disc on a frame positioned by a fine pitch lead screw (600 in FIGS. 6 and 7), and for the experiment described in this example, the flange portion was spaced so as to provide a gap of 1.3 mm (0.050 inch). The disc coater was further provided with a vibrating table dispenser, commercially available as Model 20A from Eriez Magnetics of Erie, Pa., disposed above the disc inboard of the inside diameter of the restrictor for feeding particles to the disc coater.

An organic resin was prepared by mixing a polyisocyanate prepolymer commercially available as Desmodur N100 from Bayer Corporation of Pittsburgh, Pa., with a polyurethane commercially available as Pearl White Pigment Dispersion #625-38851 from Gibraltar Chemical Works, South Holland, Ill. The mixing was performed in a static mixer generally as illustrated in FIG. 1, with the ingredients being supplied through a pair of gear pumps commercially available as Zenith model BPB gear pump from Zenith Pumps Division of Parker Hannifin Corporation, Sanford, N.C.

Primary particles were provided in the form of silica sand in the 20/30 mesh range (840/600 microns) commercially available from Badger Mining, of Berlin, Wis., under the trade designation "BB2". The primary particles were dispensed by an AccuRate™ Tuf-Flex™ feeder, model 304, from Schenk Accurate, Whitewater, Wis., into a dynamic mixer of conventional design.

Into the same dynamic mixer was dispensed powdered pigment commercially available as Iriodin™/Afflair™ pigment 9119 WR Flash Pearl from Merck Ltd., of Modderfontein, South Africa, using a separate AccuRate™ Tuf-Flex™ model 304 feeder. The primary particles, the powdered pigment, and the organic resin of Example 2 were dispensed into the dynamic mixer in a weight ratio of 47.62/1.06/3.70, and the dynamic mixer was operated at a speed of 100 rpm. The output of the dynamic mixer was directed onto the vibratory table of Example 1 at the rate of 0.4 kg/minute.

EXAMPLE 2

Glass beads commercially available as 1.9 Tigger beads with 600 ppm A1100, commercially available from 3M Company, of St. Paul, Minn., were dispensed along with the mixture of Example 3 onto the vibratory table of Example 1 by means of a K-Tron model KCL/T20 solids feeder, commercially available from K-Tron International, of Pittman, N.J., at a rate of 0.36 kg/min. The contents of the vibratory table were dispensed onto the disc of the coater according to Example 1, with the disc rotating and the speed of 525 rpm, resulting in the formation of discrete, well-encrusted retroreflective particles.

It is to be understood that the above description is intended to be illustrative, and not restrictive. Various modifications and alterations of this invention will become apparent to those skilled in the art from the foregoing description without departing from the scope of this invention, and it should be understood that this invention is not to be limited to the illustrative embodiments set forth herein.

What is claimed is:

1. A coater for preparing coated retroreflective particles, comprising:

a disc having a periphery and a major surface;

a motor engaging the disc so as to be able to spin the disc;

a restrictor mounted adjacent to the disc so as to provide a gap for the egress of coated particles, wherein the restrictor has a portion having a frusto-conical shape so that the height of the space between the disc and the restrictor diminishes with radial distance from the center of the disc and further wherein the restrictor includes a flange portion extending from the frusto-conical shape substantially parallel to the major surface of the disc;

a first dispenser for dispensing a mixture of sand particles and polymeric resin, the first dispenser disposed above the disc;

a second dispenser for dispensing glass beads, the second dispenser disposed above the disc;

wherein the surface of the disc comprises a material with a high coefficient of friction relative to the particles; and further wherein wherein the material with a high coefficient of friction is polymeric foam.

2. The coater of claim 1, further including polymeric foam on the flange portion.

* * * * *